(12) United States Patent
Lux et al.

(10) Patent No.: US 11,916,443 B2
(45) Date of Patent: Feb. 27, 2024

(54) AXIALLY CLAMPED ROTOR WITH LENGTH TOLERANCE COMPENSATION

(71) Applicant: AUDI AG, Ingolstadt (DE)

(72) Inventors: Moritz Lux, Munich (DE); Peter Suess, Stammham (DE); Lars Wetterau, Ingolstadt (DE)

(73) Assignee: AUDI AG, Ingolstadt (DE)

(*) Notice: Subject to any disclaimer, the term of this patent is extended or adjusted under 35 U.S.C. 154(b) by 70 days.

(21) Appl. No.: 17/307,398

(22) Filed: May 4, 2021

(65) Prior Publication Data
US 2021/0351648 A1 Nov. 11, 2021

(30) Foreign Application Priority Data
May 5, 2020 (DE) .......................... 102020112037.0

(51) Int. Cl.
*H02K 1/30* (2006.01)
*H02K 1/32* (2006.01)

(52) U.S. Cl.
CPC .................. *H02K 1/32* (2013.01); *H02K 1/30* (2013.01)

(58) Field of Classification Search
CPC .. H02K 1/32; H02K 1/30; H02K 1/28; H02K 1/22; H02K 9/19
See application file for complete search history.

(56) References Cited

U.S. PATENT DOCUMENTS

| 2014/0077632 | A1* | 3/2014 | King | H02K 15/03 |
| | | | | 29/598 |
| 2017/0117766 | A1* | 4/2017 | Paul | H02K 15/02 |
| 2019/0238017 | A1 | 8/2019 | Ohira | |
| 2020/0076284 | A1* | 3/2020 | Stoll | H02K 15/165 |

FOREIGN PATENT DOCUMENTS

| DE | 1 162 465 B | 2/1964 | |
| DE | 1 178 143 B | 9/1964 | |
| DE | 37 26 413 A1 | 2/1989 | |
| DE | 103 43 973 A1 | 4/2005 | |
| DE | 199 42 029 B4 | 12/2005 | |
| DE | 102007051781 B3 * | 2/2009 | ............... H02G 3/00 |
| DE | 102012022084 A1 * | 5/2014 | ........... H02K 1/2766 |
| DE | 10 2014 106 614 A1 | 11/2015 | |
| DE | 10 2016 215 760 A1 | 3/2018 | |
| DE | 102018215734 A1 * | 3/2020 | |
| EP | 1 530 278 A2 | 5/2005 | |
| WO | WO-2013045144 A1 * | 4/2013 | ........... F04D 13/064 |

OTHER PUBLICATIONS

DE-02018215734A1 English translation (Year: 2022).*
DE102012022084A1 English translation (Year: 2022).*
DE102007051781B3 English translation (Year: 2022).*
WO2013045144A1 English translation (Year: 2023).*

* cited by examiner

Primary Examiner — Christopher M Koehler
Assistant Examiner — Viswanathan Subramanian
(74) Attorney, Agent, or Firm — Seed IP Law Group LLP

(57) ABSTRACT

A rotor for an electric machine, comprising a rotor shaft and a laminated core arranged on it, comprising multiple metal plates arranged in axial succession and lying against each other, as well as at least one coolant duct running through the laminated core, wherein the laminated core is axially clamped by at least one clamping means, wherein the clamping means shoved onto the rotor shaft comprises at least one axially braced spring element and at least one tolerance compensation disk.

8 Claims, 1 Drawing Sheet

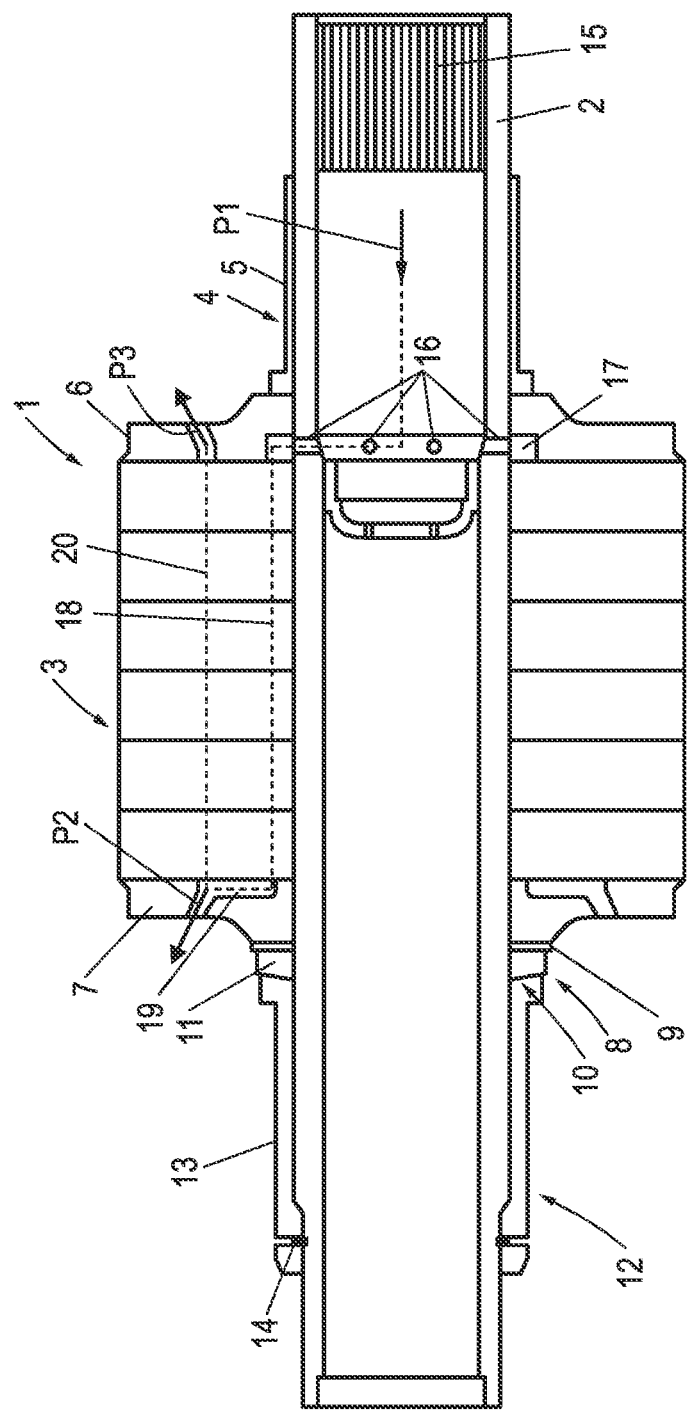

AXIALLY CLAMPED ROTOR WITH LENGTH TOLERANCE COMPENSATION

BACKGROUND

Technical Field

Embodiments of the invention relate to a rotor for an electric machine, comprising a rotor shaft and a laminated core arranged on it, comprising multiple metal plates arranged in axial succession and lying against each other, as well as at least one coolant duct running through the laminated core, wherein the laminated core is axially clamped by at least one clamping means.

Description of the Related Art

Electric machines comprising a stator and a rotor are used in various areas of application. One example is the automotive industry, where electric machines are used as drive machines for a vehicle.

A rotor usually consists of a rotor shaft and a laminated core arranged on this rotor shaft. The laminated core consists of a plurality of metal plates lying against each other in axial succession, through which the rotor shaft runs. During operation, there may occur a strong heating in the rotor area, so that it is necessary to provide for a cooling. It is known how to lead a coolant, usually oil, through the rotor shaft and thereby either cool indirectly the laminated core situated on the rotor shaft or take the coolant in one or more coolant ducts running through the laminated core in order to cool the laminated core directly. For this, it is necessary that the rotor plate have an extremely compact form, so that it is tight and the oil cannot escape from the duct between the plates. It is known how to clamp the laminated core in axially firm manner for this, so that the individual plates are firmly pressed against each other. In this way, the air is displaced from between the individual plates, so that the iron component becomes as large as possible in relation to the available length, and a sufficient tightness can be achieved thanks to the strong pressing force. In order to meet the tightness requirements, a minimum axial preloading should be ensured in all tolerance positions, and the required preloading force may be different according to the specific application. Since the laminated core behaves like a spring, the preloading force results from the spring travel and the spring stiffness, which is specific to the laminated core in dependence on the plate thickness and the pack geometry. Due to the manufacturing process, there are certain length tolerances from one laminated core to another, so that ultimately each laminated core needs to be clamped in a specific manner, because even a few tenths of a departure from the nominal spring travel of the laminated cores will lead to a significant change in the preloading force.

It is known how to clamp together the laminated core axially by using multiple axial clamping bolts in order to achieve the required preloading. For this, on the one hand, multiple boreholes are made through the laminated core, and on the other hand special long bolts are required and need to be tightened in the elastic-plastic region. On account of fluctuating friction conditions in the thread, there are fluctuations in the preloading force. Also, there is often observed a setting of the laminated cores and an associated loss of preloading force.

Alternatively, it is known how to employ a shaft nut in order to achieve the preloading. This requires costly threading work on the rotor shaft, where the shaft nut is screwed on, since the rotor shaft must have a minimum wall thickness for this, and also the thread needs to be fabricated with extreme precision on both the rotor shaft and the shaft nut. Here as well, due to fluctuating friction conditions in the thread, fluctuations in the preloading may occur. In addition, a torsion prevention is essential in order to secure the shaft nut.

BRIEF SUMMARY

Therefore, a problem to be solved is to indicate a rotor which is improved in this respect.

As the solution to this problem, in a rotor of the aforementioned kind it is proposed that the clamping means shoved onto the rotor shaft comprises at least one axially braced spring element and at least one tolerance compensation disk.

A clamping means may be used which is shoved onto the rotor shaft, and therefore the rotor shaft passes through it. The clamping means comprises at least one axially braced spring element and at least one tolerance compensation disk, that is, a combination of a ring-shaped spring element and a tolerance compensation disk is shoved onto the shaft. This arrangement, on the one hand, is braced against a corresponding abutment at the shaft side, and on the other hand against the laminated core, either directly or indirectly. Thanks to the tolerance compensation disk, a certain tolerance compensation is possible within the laminated core since, as explained above, two laminated cores never have the same identical length. Hence, the setting of such a tolerance compensation disk may result in a certain degree of tolerance compensation, while of course for larger tolerances there can be arranged multiple tolerance compensation disks in axial succession. The at least one spring element will then compensate for the residual tolerance which cannot be entirely compensated by the one or more tolerance compensation disks, the spring element ensuring that the laminated core is always axially clamped with the defined preloading, therefore assuring the tightness, because the spring element can ensure that a preloading force in the defined range is created, regardless of how large the remaining residual tolerance is. The laminated core itself will of course be axially braced on one side, and on the other side the combination of tolerance compensation disk and spring element will be arranged, being braced by a suitable support element which axially secures the laminated core on the rotor shaft.

The spring element itself may be a plate spring, it being possible to provide not only one plate spring to create the preloading or the tolerance compensation, but also multiple plate springs arranged in axial succession and forming a plate spring pack. Thanks to the stringing together of multiple plate springs to form a pack, a very large axial preloading force can be created, ensuring on the one hand the tolerance compensation by means of this preloading force, and on the other hand also pressing together the laminated core with the same constant axial clamping.

In order to avoid having a stockpile of tolerance compensation disks with many different thicknesses, it is advisable to provide only tolerance compensation disks of the same thickness or with various definite thickness gradations. A tolerance compensation disk should have a thickness of 1.0 to 6.0 mm. Multiple disks will be provided, e.g., in a gradation of 0.5 mm, i.e., disks having thicknesses of 1.0 mm, 1.5 mm, 2.0 mm, 2.5 mm, etc., so that an adequate rough compensation can be achieved by packs of multiple tolerance compensation disks of the same thickness, or even different ones, and the resulting cumulative tolerance can be compensated by the spring element or the spring pack.

As described, the combination of the at least one tolerance compensation disk and the at least one spring element, such as the plate spring pack, is axially braced, and this bracing also holds the laminated core in axial position on this side. Advisedly, there is used for this purpose a support element axially fixed in its position and arranged on the rotor shaft, against which the spring element, especially the plate spring or the plate spring pack, or the tolerance compensation disk, is braced. Thus, a corresponding ring-shaped support element, such as a simple support ring or a sleeve, is shoved on, being fixed in axial position on the rotor shaft, and providing the axial bracing. Either a support ring or a longer sleeve shoved onto the rotor shaft is used as the support element. The axial fixation can be done by a form-fitting or integrated material connection, e.g., by simple welding, that is, the support element cannot change its axial position.

The embodiments described herein have a number of benefits. On the one hand, only simple components are used, namely, one or more tolerance compensation disks and at least one spring element, such as in the form of a plate spring pack, it being possible to adjust the spring force and the achievable preloading force in a wide range by corresponding design or choice of the spring element or the plate spring pack. Thanks to the integration of the tolerance compensation disk and especially the spring element or the plate spring pack, a complete tolerance compensation is possible to ensure a defined preloading force range, and it is also possible to completely compensate for any length changes resulting by a heating of the rotor during operation, such as might result in further tolerances, without this producing a change in the axial preloading force. Since there is a pure centered construction with elements shoved onto it, which are likewise fixed in their position by a support element which is also shoved on and secured axially by form-fitting or material integration, such as by welding, no costly machining is necessary to produce threads, etc., and hence there are no resulting disadvantages in terms of adjusting a uniform preloading force.

Besides the rotor itself, embodiments of the invention moreover relate to an electric machine comprising a rotor of the above described kind.

Furthermore, embodiments of the invention relate to a motor vehicle comprising such an electric machine, being provided in the vehicle as a drive unit for its propulsion.

BRIEF DESCRIPTION OF THE DRAWING

The FIGURE shows an example embodiment of a rotor.

DETAILED DESCRIPTION

The FIGURE shows a rotor 1, having a rotor shaft 2, on which a laminated core 3 is shoved, consisting of a plurality of individual metal plates arranged in axial succession. The plates have a thickness in the range of a few tenths of a millimeter, at least in the range of around 0.25-0.3 mm, the plate thickness being naturally as homogeneous as possible over the total number of 100 to more than 1000 individual plates. Since of course the plate thickness is not constant over all the plates, there necessarily results a certain length variation from one laminated core to another, which may constitute several millimeters due to the addition of the individual tolerances. This length variation needs to be compensated in simple manner, while at the same time ensuring an axial clamping of the laminated core with a minimum surface pressure between two neighboring plates, so that a radial tightness is assured and no radial flow of coolant occurs through the laminated core.

The rotor 1 comprises an end stop sleeve 4, mounted on the rotor shaft 2, being fixed in axial position by a form-fitting or integrated material connection 5. Instead of the end stop sleeve 4, it would also be conceivable to accomplish the fixation with a plain end stop ring. A balancing disk 6 is axially braced against the end stop sleeve 4, and the laminated core 3 is axially braced in turn against it.

On the opposite side of the laminated core 3 there is arranged a second balancing disk 7, followed by a clamping means 8, by which the overall assembly is axially clamped on the one hand, but also at the same time creates the defined preloading force, as well as producing the length tolerance compensation.

For this purpose, the clamping means 8 comprises at least one tolerance compensation disk 9, which is shoved onto the rotor shaft 2. The tolerance compensation disk, having a thickness for example of 0.5 mm, and it being possible to use two or three of them for larger tolerances, enables a rough length tolerance compensation, that is, the actual length variance is already compensated in a significant amount by this.

The at least one tolerance compensation disk 9 is followed by a spring element 10, here in the form of a plate spring pack 11, which on the one hand is responsible for creating the axial clamping or clamping force by which the minimum surface pressure is achieved between the individual plates, but also on the other hand ensures the residual fine tolerance compensation, so that it is assured that the minimum preloading is achieved across the laminated core 3, despite the given length tolerance in the laminated core 3.

The plate spring pack 11 is axially braced by a support element 12, here in the form of a sleeve 13, which presses axially against the plate spring pack 11 and consequently compresses it, so that the laminated core 3 is axially pressed together. The sleeve 13 is arranged firm in axial position on the rotor shaft 2, for example, by a form-fitting or integrated material connection 14.

The laminated core 3 is pierced by a plurality of axially running ducts, not shown more closely in detail, but through which a coolant is led, namely, a cooling oil. The oil is supplied through the hollow rotor shaft 2, arriving from the side with the internal toothing 15, via a lance not otherwise shown, engaging with the hollow rotor shaft 2, from which it emerges via multiple radial boreholes 16 toward the balancing disk 6, shown at right, which has a corresponding undercut 17 into which the oil enters, see arrow P1. The undercut 17 communicates with radially inward ducts, of which one duct 18 is shown as an example. That is, the supplied oil enters into the radially inward ducts 18 and flows through the laminated core 3 to radially extending pockets 19 formed in the left balancing disk 7, of which likewise several are provided, and several ducts may emerge into the same pocket 19. For example, every other pocket 19 is open at the side toward its radially outward end, looking axially, so that, as indicated by the arrow P2, the oil can emerge on that side. The closed pockets 19 emerge into ducts 20 situated further radially outward, of which again one is shown as an example. These ducts 20 lead back to the side with the balancing disk 6 and emerge at the balancing disk 6, so that the oil can also emerge at this side, as shown by the arrow P3.

It is obvious that the laminated core 3 needs to be axially pressed together very firmly or with a defined minimum clamping force, so that a minimum surface pressure is produced between all the individual plates, ensuring that the ducts 18, 20 are sealed off, looking radially, and therefore preventing the oil from escaping radially outward through the laminated core 3 at the sometimes very high speed of the rotor 1. A minimum surface pressure of 10 kN/mm2 is customary. This Minimum surface pressure can be adjusted by integration of the combination of tolerance compensation disk 9 and plate spring pack 11, since this enables a virtually two-stage compensating of the length tolerance of the laminated core 3, because as described the one or more identical tolerance compensation disks 9 will roughly compensate for the given actual tolerance, i.e., to a large degree, while the residual tolerance is compensated and the required preloading force is produced by the plate spring pack 11.

In the assembly process, for example when the rotor shaft 15 is standing upright, after fastening the end stop sleeve 4 the balancing disk 6 is shoved on from above, and then the individual metal plates or multiple correspondingly prefabricated individual laminated cores are shoved on until the laminated core 3 is positioned. After this, the second balancing disk 7 is put in place. Next, a suitable press produces an axial pressing together of the current arrangement with a defined pressing force, which once achieved is maintained. The length of the laminated core 3 is then measured, thereby determining the length tolerance. Depending on the tolerance value, one or more tolerance compensation disks 9 are then put in place, as well as the plate spring pack 11. The sleeve 13 is then shoved onto the plate spring pack 11 and pressed with a defined force against the plate spring pack 11, so that it is compressed, after which the sleeve 13 is axially secured in the end position for example by the form-fitting or integrated material connection 14.

That is, on the whole there is an entirely centered construction, also in regard to the clamping means 8, comprising at least the one or more tolerance compensation disks 9 and the spring element 10 or the plate spring pack 11.

German patent application no. 10 2020 112037.0, filed May 5, 2020, to which this application claims priority, is hereby incorporated herein by reference in its entirety.

Aspects and features of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A rotor for an electric machine, comprising:
a rotor shaft;
a laminated core arranged on the rotor shaft, wherein the laminated core includes multiple metal plates arranged in axial succession and lying against each other, and at least one coolant duct running through the laminated core;
multiple disk springs arranged in axial succession forming a disk spring pack that is distinct from the laminated core; and
at least one length tolerance compensation disk that compensates for dimensional variations and inconsistencies resulting from manufacturing tolerances,
wherein the laminated core is axially clamped by the disk spring pack and the at least one length tolerance compensation disk.

2. The rotor according to claim 1, wherein the length tolerance compensation disk has a thickness of 1.0-6.0 mm.

3. The rotor according to claim 1, further comprising a support element arranged on the rotor shaft and axially secured in position, against which the disk spring or the length tolerance compensation disk is braced.

4. The rotor according to claim 3, wherein the support element is a support ring or a sleeve.

5. The rotor according to claim 3, wherein the support element is axially secured on the rotor shaft by a form-fitting or integrated material connection.

6. The rotor according to claim 1, wherein multiple length tolerance compensation disks are provided having a thickness gradation of 0.5 mm.

7. An electric machine, comprising a rotor including:
a rotor shaft;
a laminated core arranged on the rotor shaft, wherein the laminated core includes multiple metal plates arranged in axial succession and lying against each other, and at least one coolant duct running through the laminated core;
multiple disk springs arranged in axial succession forming a disk spring pack that is distinct from the laminated core; and
at least one length tolerance compensation disk that compensates for dimensional variations and inconsistencies resulting from manufacturing tolerances,
wherein the laminated core is axially clamped by the disk spring pack and the at least one length tolerance compensation disk.

8. A motor vehicle, comprising at least one electric machine including a rotor, the rotor including:
a rotor shaft;
a laminated core arranged on the rotor shaft, wherein the laminated core includes multiple metal plates arranged in axial succession and lying against each other, and at least one coolant duct running through the laminated core;
multiple disk springs arranged in axial succession forming a disk spring pack that is distinct from the laminated core; and
at least one length tolerance compensation disk that compensates for dimensional variations and inconsistencies resulting from manufacturing tolerances,
wherein the laminated core is axially clamped by the disk spring pack and the at least one length tolerance compensation disk.

* * * * *